(12) United States Patent
Middleton et al.

(10) Patent No.: US 9,807,288 B2
(45) Date of Patent: Oct. 31, 2017

(54) SYSTEMS, METHODS, AND APPARATUSES FOR IMPLEMENTING MULTI-LENS ARRAY CAMERAS AND MOUNTS

(71) Applicant: Intel Corporation, Santa Clara, CA (US)

(72) Inventors: Daniel C. Middleton, Orono, MN (US); Evan R. Green, Tualatin, OR (US); Luis S. Kida, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/866,688

(22) Filed: Sep. 25, 2015

(65) Prior Publication Data
US 2017/0094136 A1 Mar. 30, 2017

(51) Int. Cl.
*H04N 5/225* (2006.01)
*G02B 7/02* (2006.01)
(Continued)

(52) U.S. Cl.
CPC ......... *H04N 5/2254* (2013.01); *G02B 3/0056* (2013.01); *G02B 7/021* (2013.01); *G02B 7/14* (2013.01); *H04N 5/2252* (2013.01)

(58) Field of Classification Search
CPC .... H04N 5/2254; H04N 5/2252; G02B 7/021; G02B 7/14; G02B 3/0056
See application file for complete search history.

(56) References Cited

U.S. PATENT DOCUMENTS

2007/0188653 A1 8/2007 Pollock et al.
2012/0044409 A1* 2/2012 Uchiyama ............... G03B 3/10
348/345

(Continued)

OTHER PUBLICATIONS

Multiple Camera Array User's Guide, Tetracam, Inc., http://www.tetracam.com/PDFs/Mini-MCA%20Users%20Guide%20V2.3.pdf, Version 2.3—Apr. 2011, 41 pages.

(Continued)

*Primary Examiner* — Ahmed A Berhan
(74) *Attorney, Agent, or Firm* — Blakely Sokoloff Taylor and Zafman LLP

(57) ABSTRACT

In accordance with disclosed embodiments, there are provided methods, systems, and apparatuses for implementing multi-lens array cameras and mounts. In one embodiment there is a lens mount assembly, having therein a lens mount with a front side and a back side; a lens array mounted to the front side of the lens mount, the lens array having a plurality of optics embedded within lenses mounted to the front side of the lens mount; a plurality of image capture circuits at the back side of the lens mount, the plurality of image capture circuits having a one to one correspondence to the lenses of the lens array mounted to the front side of the lens mount; and a plurality of receiving couplers at the front side of the lens mount, each to receive one of the lenses of the lens array, wherein the receiving couplers mechanically bring the optics of the respective lens mounted thereto into alignment with a corresponding one of the image capture circuits on the back side of the lens mount opposing the mounted lens. The lens mount assembly may be embodied within a camera body assembly such as a hand-held smart phone, a tablet computing device or a stand alone hand held camera. The lens mount assembly may be interchangeable with other lens mount assemblies for a multi-lens array camera. Other related embodiments are disclosed.

25 Claims, 11 Drawing Sheets

(51) Int. Cl.
*G02B 7/14* (2006.01)
*G02B 3/00* (2006.01)

(56) References Cited

U.S. PATENT DOCUMENTS

2013/0135429 A1* 5/2013 Lablans ................ G03B 37/00
348/36
2014/0368731 A1* 12/2014 Hyers ................ H04N 5/2252
348/374

OTHER PUBLICATIONS

Creating a Board-Level Multiple FireWire Camera Array for OEM Applications, https://www.ptgrey.com/KB/10553, 2015, 6 pages.
Pelican Imaging Website, www.pelicanimaging.com, retrieved Sep. 9, 2015, 43 pages.

* cited by examiner

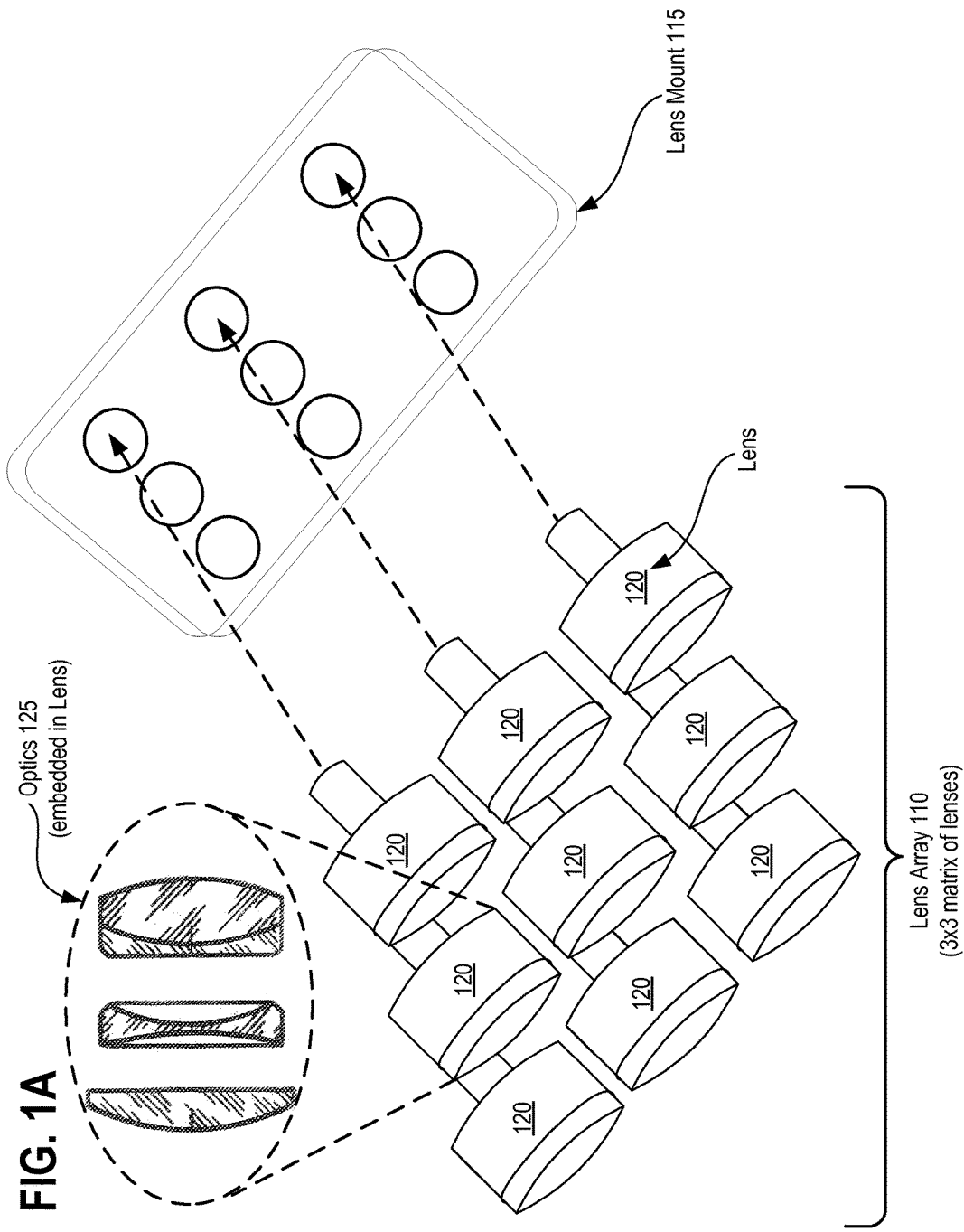

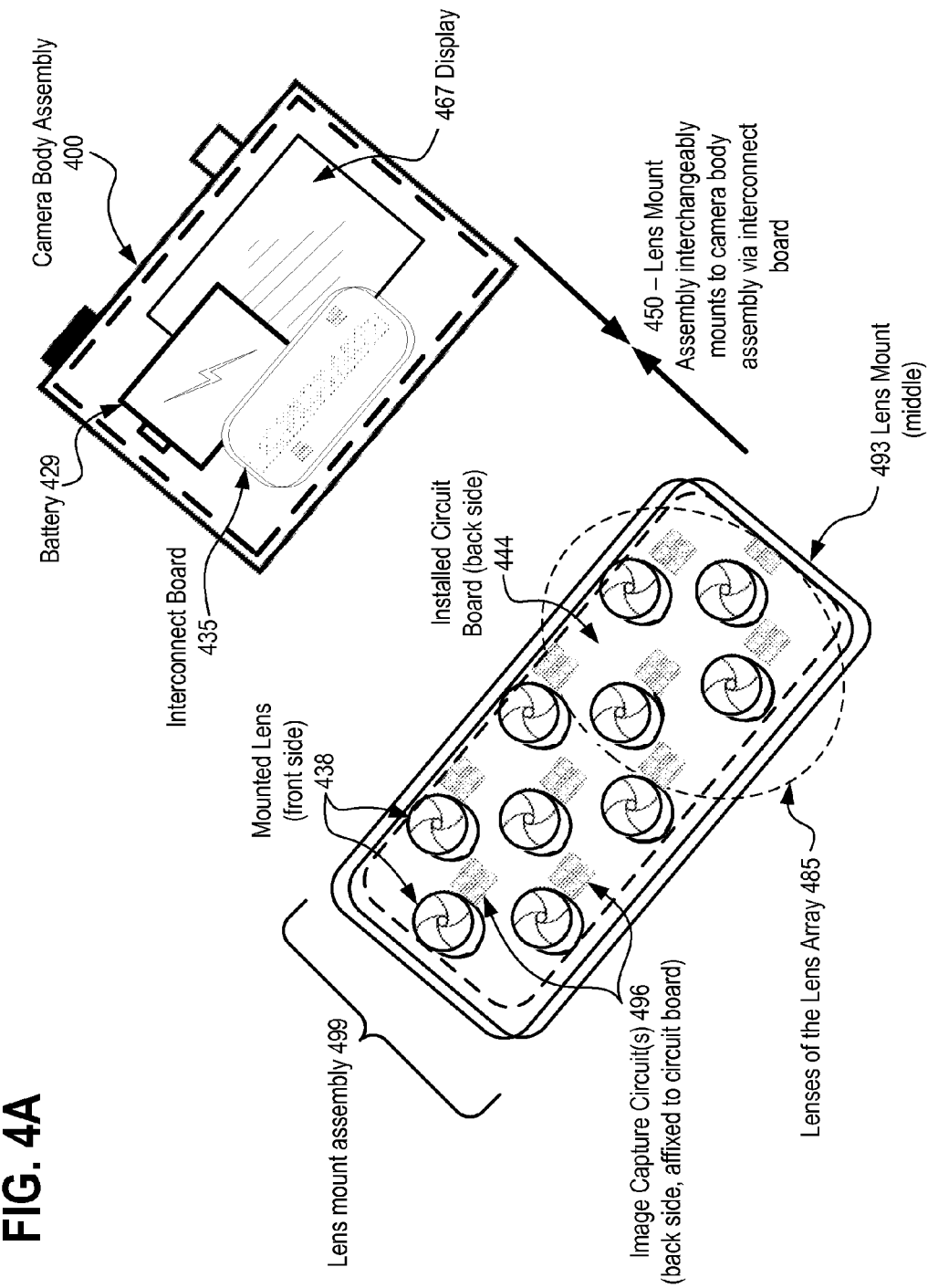

403

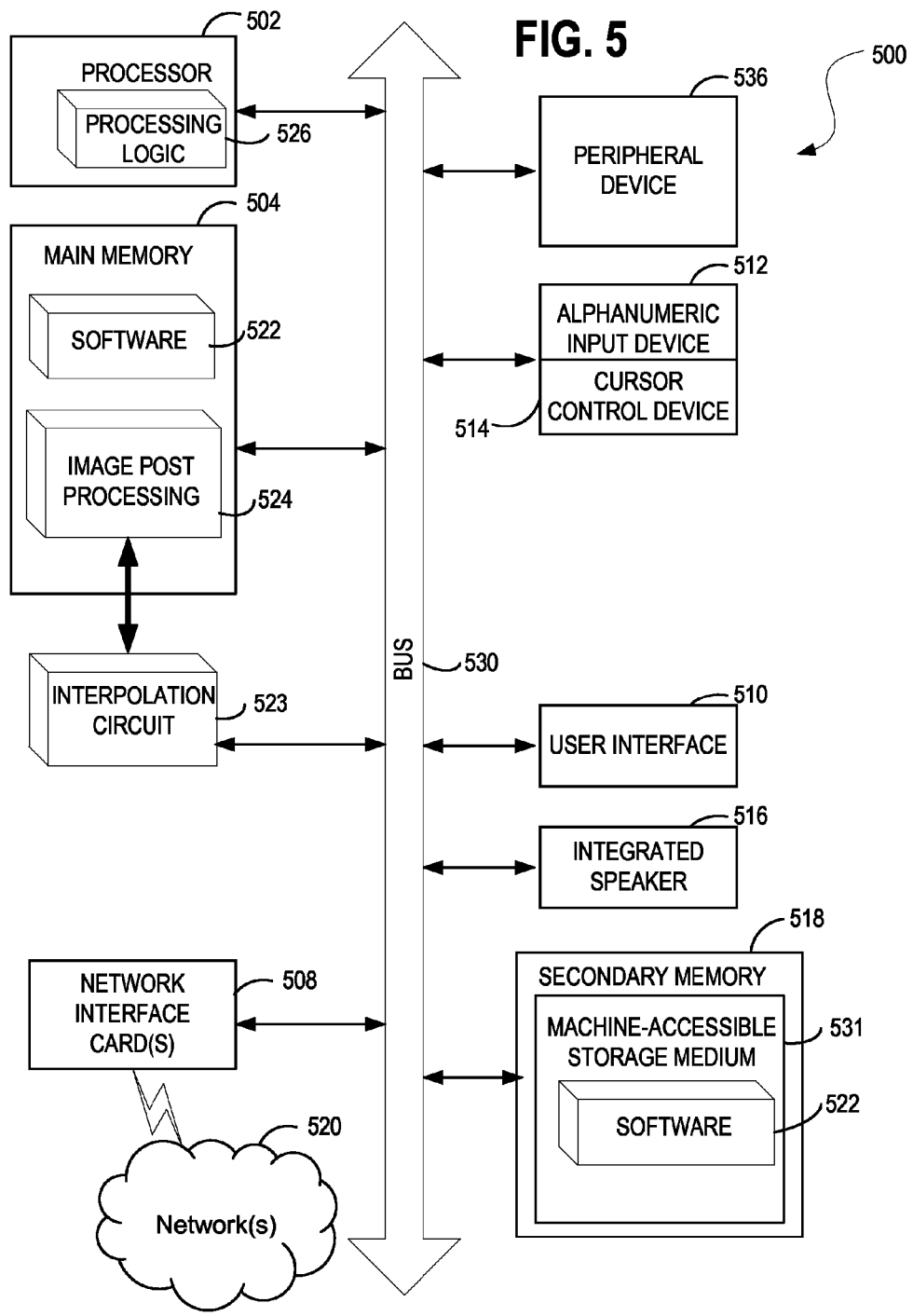

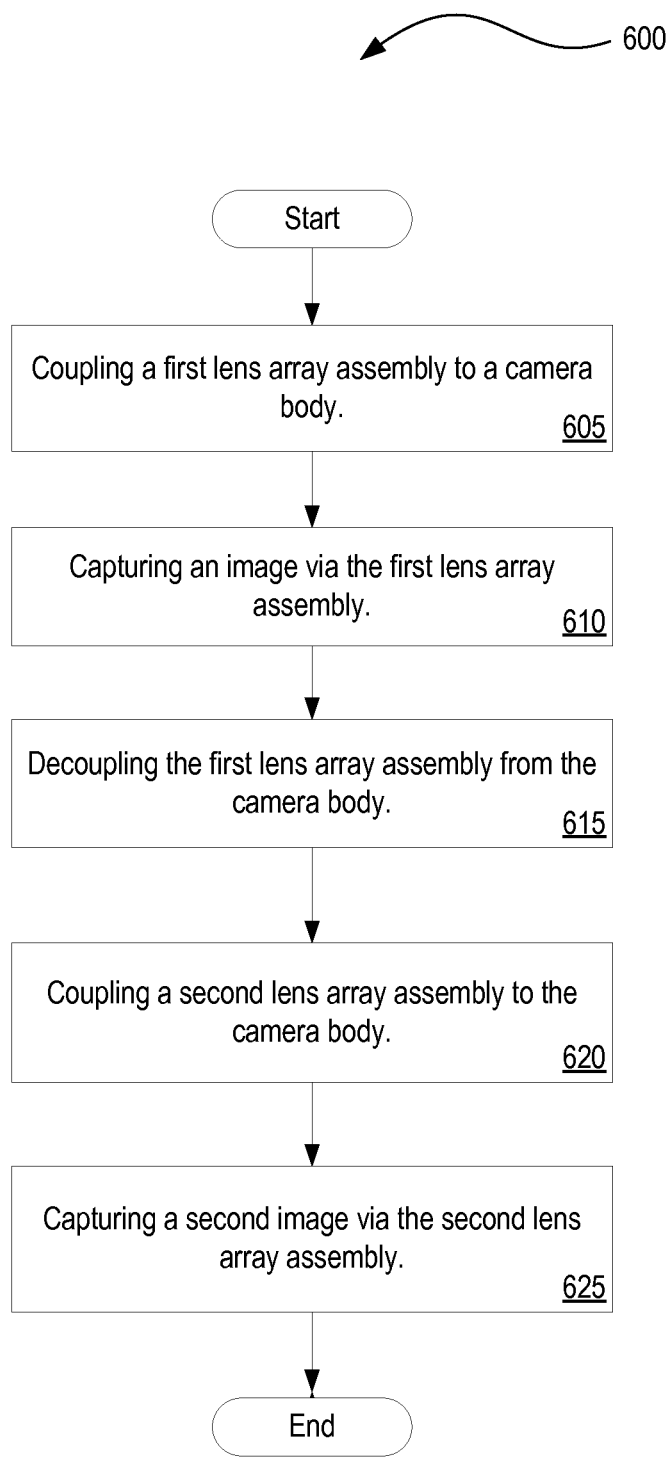

SYSTEMS, METHODS, AND APPARATUSES FOR IMPLEMENTING MULTI-LENS ARRAY CAMERAS AND MOUNTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of image capture technologies, such as cameras, and more particularly, to systems, methods, and apparatuses for implementing multi-lens array cameras and mounts.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In the market place today there are a wide variety of Single Lens Reflex or "SLR" cameras and there are now available modern digital variants of these cameras which are known as Digital Single Lens Reflex or "DSLR" cameras. The SLR cameras simply capture images by exposing film whereas the DSLR cameras capture images via a digital image capture circuit, such as a Complementary metal-oxide-semiconductor (CMOS).

A fundamental drawback of such cameras is the problem of a single focal length for the entire camera system, thus limiting the camera's ability to capture only a single focal point at a single angle in a single image capture mode at a single moment in time, thus resulting in a relatively small sample of the visual information which is all around the camera and especially within the photographed scene.

The present state of the art may therefore benefit from the systems, methods, and apparatuses for implementing multi-lens array cameras and mounts as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A illustrates an exemplary architecture with a homogeneous lens array in accordance with described embodiments;

FIG. 4A illustrates an exemplary lens mount assembly interchangeably mounted to a camera body assembly via an interconnect board in accordance with described embodiments;

FIG. 5 illustrates a diagrammatic representation of a machine in the exemplary form of a computer system, in accordance with one embodiment; and FIG. 6 is a flow diagram illustrating a method 600 for using a multi-lens array camera and lens array assembly in accordance with the described embodiments.

DETAILED DESCRIPTION

Figure 1B:
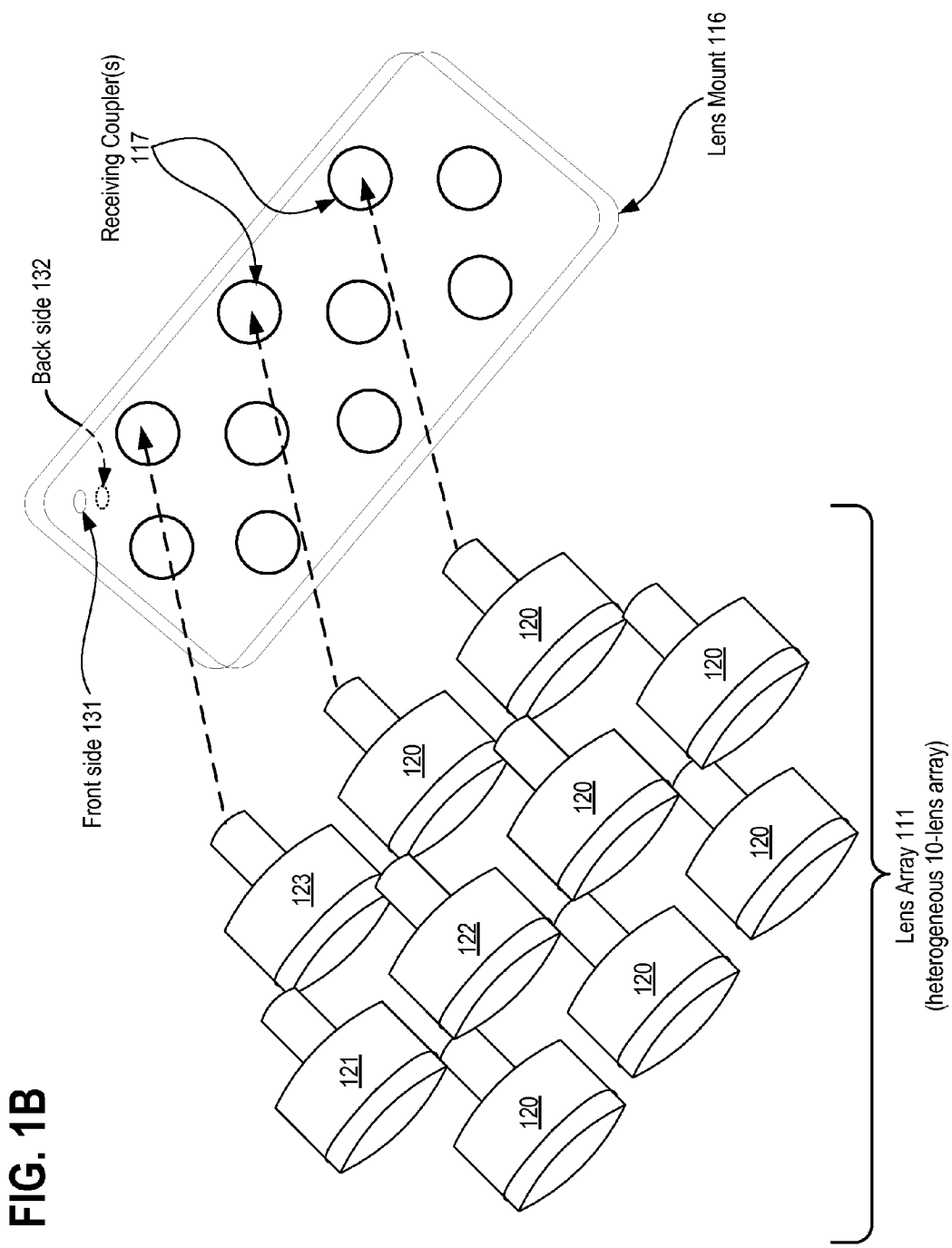
FIG. 1B illustrates an exemplary architecture with a heterogeneous lens array in accordance with described embodiments.

Described herein are systems, methods, and apparatuses for implementing multi-lens array cameras and mounts. For example, in one embodiment there is a lens mount assembly, having therein a lens mount with a front side and a back side; a lens array mounted to the front side of the lens mount, the lens array having a plurality of optics embedded within lenses mounted to the front side of the lens mount; a plurality of image capture circuits at the back side of the lens mount, the plurality of image capture circuits having a one to one correspondence to the lenses of the lens array mounted to the front side of the lens mount; and a plurality of receiving couplers at the front side of the lens mount, each to receive one of the lenses of the lens array, wherein the receiving couplers mechanically bring the optics of the respective lens mounted thereto into alignment with a corresponding one of the image capture circuits on the back side of the lens mount opposing the mounted lens. The lens mount assembly may be embodied within a camera body assembly such as a hand-held smart phone, a tablet computing device or a stand alone hand held camera. The lens mount assembly may be interchangeable with other lens mount assemblies for a multi-lens array camera.

Array cameras or multi-lens array cameras are image capture devices having therein multiple sensor and optics modules and are generally targeted for integration into phones, tablets, and hand-held still and video cameras operable as stand-alone devices.

Although SLR and DSLR cameras are commonplace in the market today, they exhibit a significant limitation insomuch that they are inherently restricted to a single focal length for the entire camera system, thus limiting the camera to capturing only a single focal point at a single angle in a single image capture mode at a single moment in time. Cameras in the market place today, including those which offer more than on lens, do not offer versatility in focal lengths. Conversely, described herein are multi-lens array cameras and mounts which support lens mount having lenses of differing focal lengths supporting, for instance, telephoto, wide-angle, macro, fisheye, etc.

Most animals, including humans, make use of multiple simultaneous inputs because doing so provides significantly more information about their surroundings in comparison to only a single sample as with an SLR camera.

Unfortunately, converting a conventional SLR or DSLR style camera to a multi-lens camera with an array of optics is not a simple conversion due to the problem of many moving parts and problematic alignment, each of which complicates image capture and degrades the resulting image quality.

One solution to the problem of alignment and calibration is to perform software calibration in which the software of a camera or image processing system is "taught" appropriate calibration parameters for a given environment, especially with regard to environmental light conditions, and then those calibration metrics are applied to captured images in post-capture software processing. This approach has a serious drawback, however, insomuch that it is literally required that the camera take a photograph of a calibration image, thus wasting time, requiring the user to actually carry a calibration image, wasting storage space, and most critically, training the camera to a single light condition environment ignores the reality that light conditions constantly fluctuate and thus, the calibration metrics will immediately begin to spoil as the light conditions surrounding the camera taker (e.g., user) deviate from those light conditions present within the frame of image capture and at the time of image capture that software was taught or trained using the calibration image.

For instance, one approach utilizing such a solution mandates the taking a photograph of a "software calibration tile" which must be "under the same lighting conditions" to teach the software what the spectral balance of that day's sunlight is at the time of the photograph. The software, having then been taught through the photograph of the software calibration tile, then utilizes the ratio of red/NIR or green/NIR which is applied as an offset to the calculation of the vegetation indices. Unfortunately, if the lighting conditions change, then the pictures are unlikely to be accurate or useful. Moreover, this approach further dictates that the software calibration tile be parallel to the ground, not overexposed, not in direct reflection of the sun, and as noted, in the same lighting contains to be used later, which of course, is an impossibility absent the strictest controlled laboratory conditions.

It is a solution, but one that comes at great pains and effort to users of such a camera and one that is prone to significant opportunity for error.

Conversely, what is described herein are systems, methods, and apparatuses for implementing multi-lens array cameras and mounts intended for integration into consumer electronics, including hand-held cameras, smartphones, and tablets. The solution must be user-friendly and suitable for even the most novice of photographers.

The reality is that today's marketplace for consumer electronics, especially with regard to smartphones and tablets, the on-board built-in camera is a major driver of sales and as such, OEMs, that is, the Original Equipment Manufacturers of such devices are constantly seeking to provide higher quality and improved image capture capabilities. As such, mobile camera component integrators, manufacturers of mobile devices such as smartphones and tablets and hand-held cameras, and consumers alike will benefit from and indeed desire to have more sophisticated image capture capabilities in their components and devices. Such solutions must be easy to use and produce quality imagery if they are to be accepted in today's commercial marketplace. Users of such devices assuredly will not carry a "software calibration tile" with them which must be photographed prior to snapping a candid photo, and as such, manufactures simply will not accept or adopt such a solution.

Another solution to solving the problem of alignment and calibration is simply capture multiple images from multiple camera which are not aligned or calibrated with respect to one another, and then subsequently "stitch" the multiple resulting photographs together via software. The obvious problem with this approach is that what results are individual data samples for multiple photographs which happen to be taken simultaneously or nearly simultaneously, rather than richer information for a single image taken from multiple optics of the same camera. The distinction is not pedantic, as the resulting output of a non-aligned multi-camera approach creates an image that is more akin to a panoramic photo created by software stitching a series of photos together taken over time which results in well-known blurring and misalignment problems, in addition to wholly lacking the richer information described above as the series of photographs each result from a singular focal length for each of the images which are subsequently stitched together via software to form a single image.

Conversely, by having multiple physically different positions from which an image capture system samples light, the resulting inputs provide information necessary to mathematically solve problems such as how far away an object is from the point of capture, and if it is known how far away an object is, then it is further possible to interact with the photograph differently than is possible with conventional images from a single focal length camera. For instance, it is possible to make edits that only affect objects that are nearer or only objects that are farther away. It is possible to, for example, remove objects from the photograph that are nearer or farther or they can be blurred, or modified in some other way, but for which the modifications are limited based on a distance or a distance range from the image capture device. It is further possible to change the vantage point of the viewer of the photograph to appear as though it comes from any of the positions from which the light was captured or sampled using a multi-lens array camera as described herein. Having captured the light from all of the different positions and angles of the multi-lens array camera, it is still further possible to interpolate between those points to create a multitude of different visual effects.

As alluded to above, the complexity with such a multi-lens array camera is that, unlike a conventional SLR or DSLR camera in which the camera need only be aligned with the optics of a lens, a multi-lens camera requires that each of the lenses be aligned relative to one another. With consumer oriented products, it is further necessary to ensure that when lenses are interchanged, the alignment amongst the lenses in a multi-lens array not be disrupted, or be capable of simple re-alignment by the consumer.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary architecture with a homogeneous lens array in accordance with described embodiments. Specifically depicted here is the lens array 110 having a 3×3 matrix of lenses 120, each of the lenses being of the same type, thus forming a heterogeneous lens array.

The individual lenses 120 each include optics 125 embodied within the lens. The lenses 120 mount to a lens mount 115.

FIG. 1B illustrates an exemplary architecture with a heterogeneous lens array in accordance with described embodiments. In particular, depicted here are a lens mount 116 with receiving couplers 117 on a front side 131 to receive each of the many lenses making up the depicted lens array 111. The lens array 111 is a heterogeneous 10-lens array having therein lenses 120, 121, 122, and 123. According to the depicted embodiment, lenses 120, 121, 122, and 123 are each of a different lens type, each having optics embedded therein of differing characteristics, such as different focal lengths, different apertures, different shutter speeds, different filters, etc., thus forming a heterogeneous lens array.

For instance, it may be that the consumer whishes to change from a wide-angle configuration for the lens array to a telephoto lens configuration for the lens array. In an alternative embodiment, the consumer may wish to change the lens array from a homogeneous wide-angle or telephoto configuration into a heterogeneous configuration for the lens array with some of the lenses of the array being wide-angle and other lenses of the array being telephoto.

According to a particular embodiment, SLR or DSLR camera lenses are mountable to the lens mount 116 via the receiving couplers 117. For instance, a 35-mm lens for a conventional digital or film SLR camera is mountable to the lens mount 116 via the receiving couplers according to such an embodiment.

In certain embodiments the end user consumer is able to change some or all of the lenses on the lens mount 116 via the receiving couplers 117.

Thus, it is in accordance with one embodiment that a multi-lens camera is provided with interchangeable lenses within an array of lenses, or a lens array, for the camera. In one embodiment some or all of the lenses of a multi-lens array are interchangeable by a consumer. In another embodiment, the individual lenses of the lens array are not interchangeable by a consumer, but the lens mount having the lenses fixedly attached thereupon is interchangeable as a unit by a consumer such that a different lens mount having a multi-lens array of different optics may be interchanged by the consumer.

Figure 2:
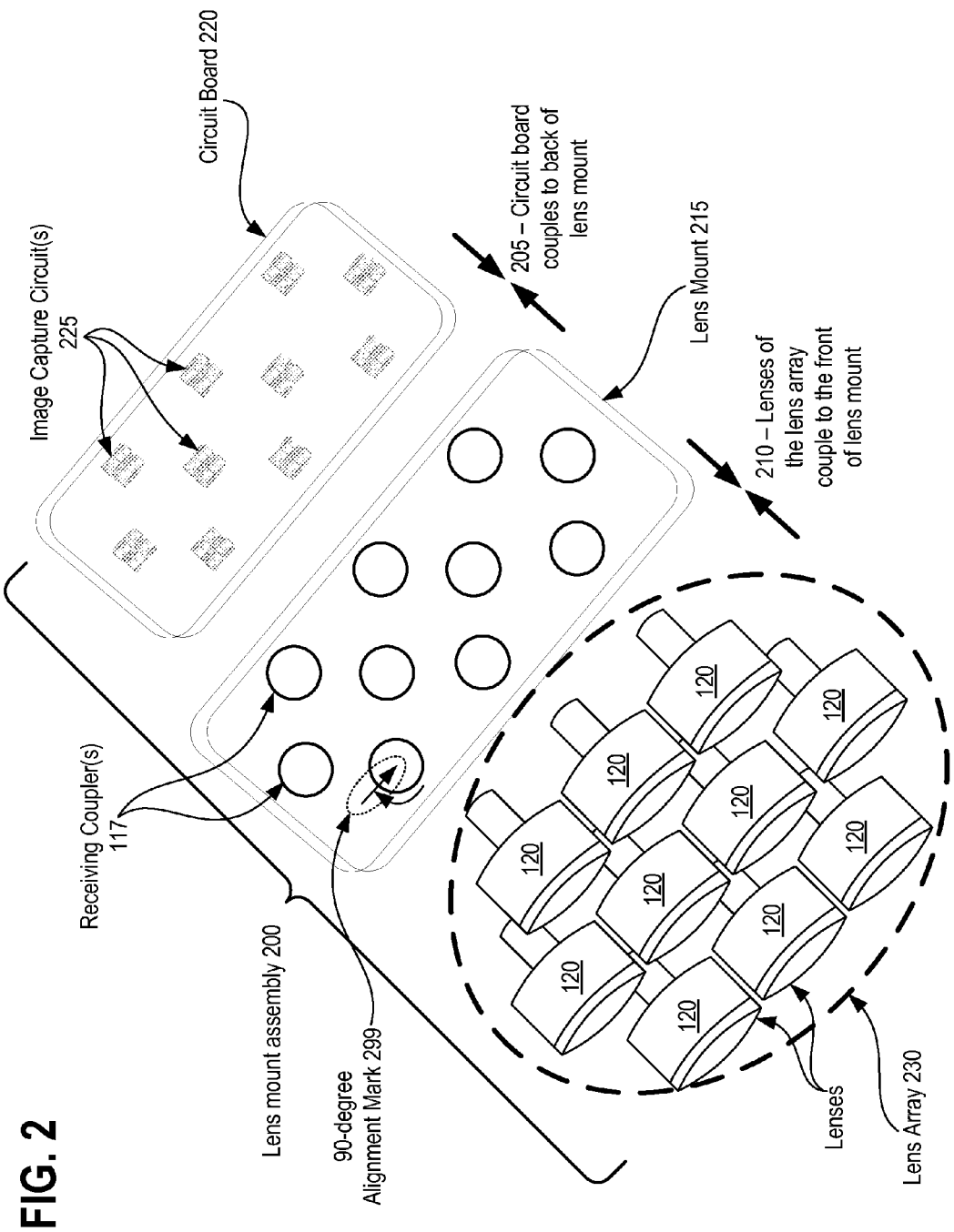
FIG. 2 illustrates an exemplary lens mount assembly in accordance with described embodiments.

FIG. 2 illustrates an exemplary lens mount assembly 200 in accordance with described embodiments. More particularly, depicted here are lenses 120 (each having optics embedded therein), the lenses 120 forming a lens array 230, a lens mount 215, and a circuit board 220. The lens mount 215 again depicts the receiving couplers 117. The circuit board 220 depicts image capture circuits 225, such as CMOS(s).

At element 205 it is shown that the circuit board couples to the back (e.g., backside 132) of the lens mount and at element 210 it is shown that lenses of the lens array 230 couple to the front (e.g., front side 131) of the lens mount.

In one embodiment, a lens mount has an optical front end at the front side 131 of the lens mount 116, the optical front end consisting of multiple optics (e.g., via the optics of lenses 120, 121, 122, and 123) fixedly attached to a front plane (e.g., at the front side 131) of the lens mount 116. In such an embodiment, the lens mount 116 further includes a digital back end at the back side 132 of the lens mount 116 having multiple image capture circuits, each being fixedly attached to a back plane of the lens mount 116, the multiple image capture circuits having a one to one correspondence to the multiple optics fixedly attached to the front plane (e.g., front side 131) of the lens mount 116.

According to a particular embodiment, the front end (front side 131) optics capture or sample light to the image capture circuits on the digital back end (back side 132) and the digital back end is communicably interfaced to other array camera components and circuitry via high-speed serial interface(s). According to one embodiment the front end is optical and the back end is electrical and information is stored and manipulated in a digital form after being received by the image capture circuits.

According to one embodiment, each of the lenses are mechanically aligned to the lens mount 215 via the receiving couplers 117 and capable of being replaced by consumers and re-aligned to the lens mount via mechanical lens mount guides which mechanically force the optics of the lens 120 into alignment with a corresponding image capture circuit 225 fixedly attached to an opposing side of the lens mount 215 and which is not replaceable by the consumer.

In such an embodiment, optics are embedded within the lens 120 and aligned to mechanical lens mount guides of the lens 120 complementary to the receiving couplers 117 of the lens mount 215, the mechanical lens mount guides of the lens 120 mechanically coupling the lens to the mechanical lens mount guides via the receiving couplers 117 on the lens mount 215, such that mounting the lens 120 to the lens mount 215 mechanically aligns the lens 120 to the lens mount 215 as well as aligns the optics embedded within the lens 120.

In a related embodiment a circuit board 220 having the multiple image capture circuits 225 attached thereto is mounted to the back plane (e.g., back side 132) of the lens mount 215, in which installing the circuit board into the lens mount 215 mechanically aligns the multiple image capture circuits 225 to the lens mount 215 and when the lenses 120 are mounted to the lens mount 215 the lenses 120 are mechanically aligned to the lens mount 215 and in turn the lenses 120 are also mechanically aligned to the multiple image capture circuits 225 on the installed circuit board 220.

According to a particular embodiment, there is a lens mount which is interchangeable by a consumer on a multi-lens array camera, the lens mount having an analog front end (at the front side 131) and a digital back end (at the back side 132), in which the analog front end includes a front surface of the lens mount 215 having a plurality of optics embedded within lenses 120 mounted thereupon, and in which the lens mount 215 includes the digital back end including a circuit board 220 with multiple image capture circuits 225 having a one to one correspondence to the multiple optics of the analog front end and in physical and mechanical alignment to the multiple image capture circuits 225 of the digital back end through the lens mount 215.

According to one embodiment, the lens mount 215 is formed from aluminum and the lenses 120 of the analog front end are coupled to the lens mount 215 via threaded screw mounts. According to another embodiment, the lenses 120 are mountable to the lens mount 215 via one of an S-Mount type lens mount, an E-Mount type lens mount, a T-Mount type lens mount, an EF type lens mount, an ES type lens mount, an EF-S type lens mount, an F type lens mount, an M42 type lens mount, a K type lens mount, a micro-four-thirds (4/3) type lens mount, an FD type lens mount, an NEX type lens mount, an R type lens mount, an ND type lens mount, or an MD/MC/SR compatible type lens mount.

According to one embodiment a receiving coupler 117 of the lens mount 215 is machined into the aluminum lens mount 215 body to form a physical lens mount via the machined receiving coupler 117 for each of the plurality of lenses 120 making up the lens array 230.

In one embodiment, the optics of the lenses 120 are physically coupled to and mechanically aligned with the lens mount 215 to keep the plurality of lenses of the lens array 230 rigid and aligned with one another and the electronics of the digital back end of the lens mount are decoupled from the lenses 120 making up the lens array 230 and the camera body, but are capable to be coupled and aligned with the optics of the lenses by mounting the plurality of lenses 120 to a lens plate formed by the lens mount 215 and installing the electronics of the digital back end via a circuit board 220 having the multiple image capture circuits 225 integrated thereupon.

If the lenses 120 did not have rigid and mechanically aligned receiving couplers 117 to couple the lenses 120 to the lens mount 215, but rather, had separate receiving couplers for the camera or had floating receiving couplers for the camera, then the multiple lenses making up the lens array 230 would not be able to maintain their alignment with one another. The lens array camera requires precise alignment between the lenses 120 which make up the lens array 230.

In one embodiment, all of the individual lenses of the lens array need to be pointing parallel to each other. In another embodiment, the lens need to maintain their orientation to one another, but not necessarily in parallel. In another embodiment, the lens array has a convex orientation and the mechanical coupling of the lenses to the lens mount keeps the origination of the lenses to one another, specifically, each lens is oriented to be pointing out a slight angle from the other lenses in the lens array, but in a rigid attachment to the lens mount and in a fixed orientation to the other lenses once mounted to the lens mount. In such an embodiment, captured light samples are mathematically adapted to the known and fixed origination amongst the multiple lenses based on the mechanically alignment enforced upon the mounting of the lenses of the lens array to the lens mount in the convex orientation.

In yet another embodiment, the multiple lenses 120 of the lens array 230 are physically aligned to the lens mount 215 in a non-parallel orientation with a pre-determined fixed degree of angular departure between them, enforced by the physical receiving couplers 117 of the lens mount 215, in which post-image-capture processing adapts the sampled light captured by multiple optics of the lens array according to the known and pre-determined fixed degree of angular departure between the respective lenses 120.

According to a particular embodiment, the receiving couplers 117 of the lens mount 215 enforce a known distance between the optics embodied within each respective lens and a corresponding image capture circuit 225 and enforce a known axis between the optics embodied within each respective lens 120 and a corresponding image capture circuit 225.

According to a particular embodiment, each of the plurality of lenses 120 of the lens array 230 are manual focus, in which the lenses 120 are physically mounted upon the lens mount via receiving couplers of the lens mount and individually focused. In another embodiment, each of the receiving couplers 117 of the lens mount 215 include electronic contacts to interface in-camera controllable lens options such as aperture, focus, and shutter speed with a compatible lens, and in which each of the lenses 120 of the lens array 230 auto-focuses at the direction of the multi-lens array camera.

According to one embodiment, there is included on the lens mount 215 a 90-degree mark 299 aligned with an axis or a center of the image capture circuit 225, wherein the receiving couplers 117 of the lens mount 215 forces alignment of each lens 120 on a first plane and wherein the lens 120 is manually aligned or align-able to a second plane via the 90-degree mark 299.

In one embodiment, all of the lenses 120 of the lens array 230 are fixedly attached to the lens mount 215 and the lens mount with the plurality of the lenses 120 is removable from the multi-lens array camera as a single unit lens mount assembly 200 with the corresponding plurality of image capture circuits 225 installed within the lens mount 215 and a different lens mount assembly 200 having a different plurality of lenses 120 in a different lens array 230 with a corresponding different plurality of image capture circuits 225 installed into the different lens mount 215 is then mountable to the multi-lens array camera as a single unit lens mount assembly. In such a way, replacing the lens mount assembly 200 of a multi-lens array camera not only replaces the optics, but additionally replaces the electronic film or image capture circuits 225 behind them as a single unit, ensuring the most precise alignment and calibration.

According to such an embodiment, the plurality of lenses 120 making up the lens array 230 and the corresponding plurality of image capture circuits 225 are not consumer changeable nor are they detachable from the lens mount 215. In a related embodiment, such a lens mount assembly 200 is manufactured by a camera component manufacturer and sold as a single unit to an OEM for integration within a smart phone or tablet consumer device.

According to as particular embodiment, a plurality of CMOS image capture circuits 225 are integrated into the lens mount 215 on a back side 132 to ensure precise alignment and a corresponding plurality of lenses 120 making up the lens array 230 are mountable to an opposing side, the front side 131, of the lens mount 215, each of the lenses 120 being physically coupled to the lens mount via the receiving couplers 117 of the lens mount 215 which mechanically guides each of the plurality of lenses 120 into an aligned position with the integrated CMOS image capture circuits 225 of the back side of the lens mount 215.

In a particular embodiment each of the image capture circuits 225 are adhered to a back plane of the lens mount 215 and are not consumer replaceable and each of a plurality of lenses 120 which make up the lens array at a front side of the lens mount are consumer replaceable either individually or as a lens array unit, separate from the lens mount having the image capture circuits 225 adhered to the back plane thereof.

According to a particular embodiment in which a consumer may change the individual lenses 120 which make up the lens array 230, a degradation in alignment precision is tolerated by the multi-lens array camera by applying post-image capture processing which performs a plurality of image interpolations to increase tolerance of misalignment between the individual lenses 120 of the lens array 230. In one embodiment, interpolations include interpolating between light samples taken from a wide-angle lens of the lens array 230 to a narrow angle lens of the lens array 230 across an angular separation or across a spatial separation. According to one embodiment, the interpolations are performed by an interpolation circuit embedded within a camera body with the lens mount assembly 200. In another embodiment, the interpolations are performed separate from the camera body having the lens mount assembly 200 embodied therein.

Figure 3:
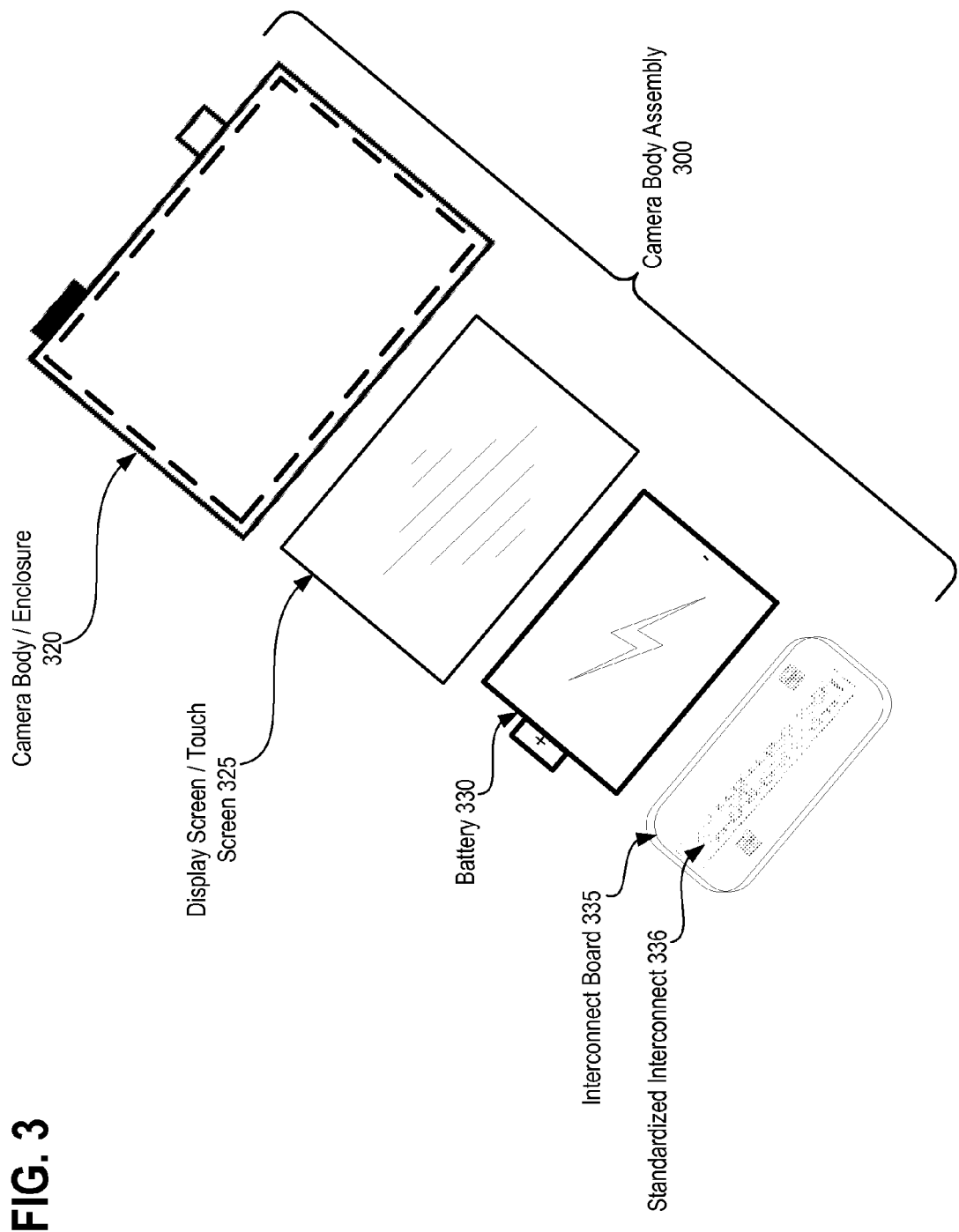
FIG. 3 illustrates an exemplary camera body assembly in accordance with described embodiments.

FIG. 3 illustrates an exemplary camera body assembly 300 in accordance with described embodiments. In particular, depicted here and making up the camera body assembly 300 are a camera body 320 (e.g., enclosure), a display screen/touch screen 325, a battery 330, an interconnect board 335, and a standardized interconnect 336 on the interconnect board 335.

In accordance with a particular embodiment, there is a camera body assembly 300 having the multi-lens array camera embodied within a camera body 320, the camera body 320 enclosing the lens array (230 from FIG. 2) mounted upon a front side of a lens mount, a circuit board with a plurality of image capture circuits mounted thereto and installed into the lens mount, the circuit board having one image capture circuit for each one of the lenses in the lens array, the camera body further including an interconnect board 335 which according to one embodiment provides a standard interconnect 336 mount that accepts the lens mount (215 of FIG. 2) with the lenses and the circuit board with the images capture circuits attached thereto, the camera body 320 further including a battery 330, a display screen/touch screen 325, such as a Liquid Crystal Display (LCD) or touch display interface, one or more input devices (not shown), one or more storage components (not shown), and an interconnecting bus (not shown). In accordance with such embodiments, the camera body may further include in connectivity with an interconnecting bus: a processor, in the form of a microcontroller or CPU or FPGA, internal and external storages, storage interfaces such as solid state memory or other non-volatile memory, a Front Side Bus in connectivity with the interconnecting bus, and multiple other components within the camera body such as power control, and other components and circuitry in support of the camera mount and the lens array.

FIG. 4A illustrates an exemplary lens mount assembly interchangeably mounted to a camera body assembly 400 via an interconnect board 435 in accordance with described embodiments.

As depicted at element 450, the lens mount assembly 499 interchangeably mounts to the camera body assembly 400 via the interconnect board 435.

In one embodiment, the camera body assembly 400 includes multiple components that are re-usable with multiple different lens array configurations such that a consumer need not re-purchase or an entire camera body assembly 400 to utilize a different lens array 485 as described herein. For instance, a camera body assembly 400 may include the display 467, such as a touch screen interface, processors, memory, storage, power control, interconnecting busses, the battery 429, and an interconnect board 435 and interconnect, all of which is re-usable amongst multiple multi-lens array 485 and lens mount 493 configurations, such that different lens mount assemblies 499 of the lenses (e.g., front side mounted lenses 438 shown here), the lens mount 493, and the image capture circuits 496 affixed to the circuit board 444 at the back side may be interchanged with the camera body assembly 400 by the consumer.

Figure 4B:
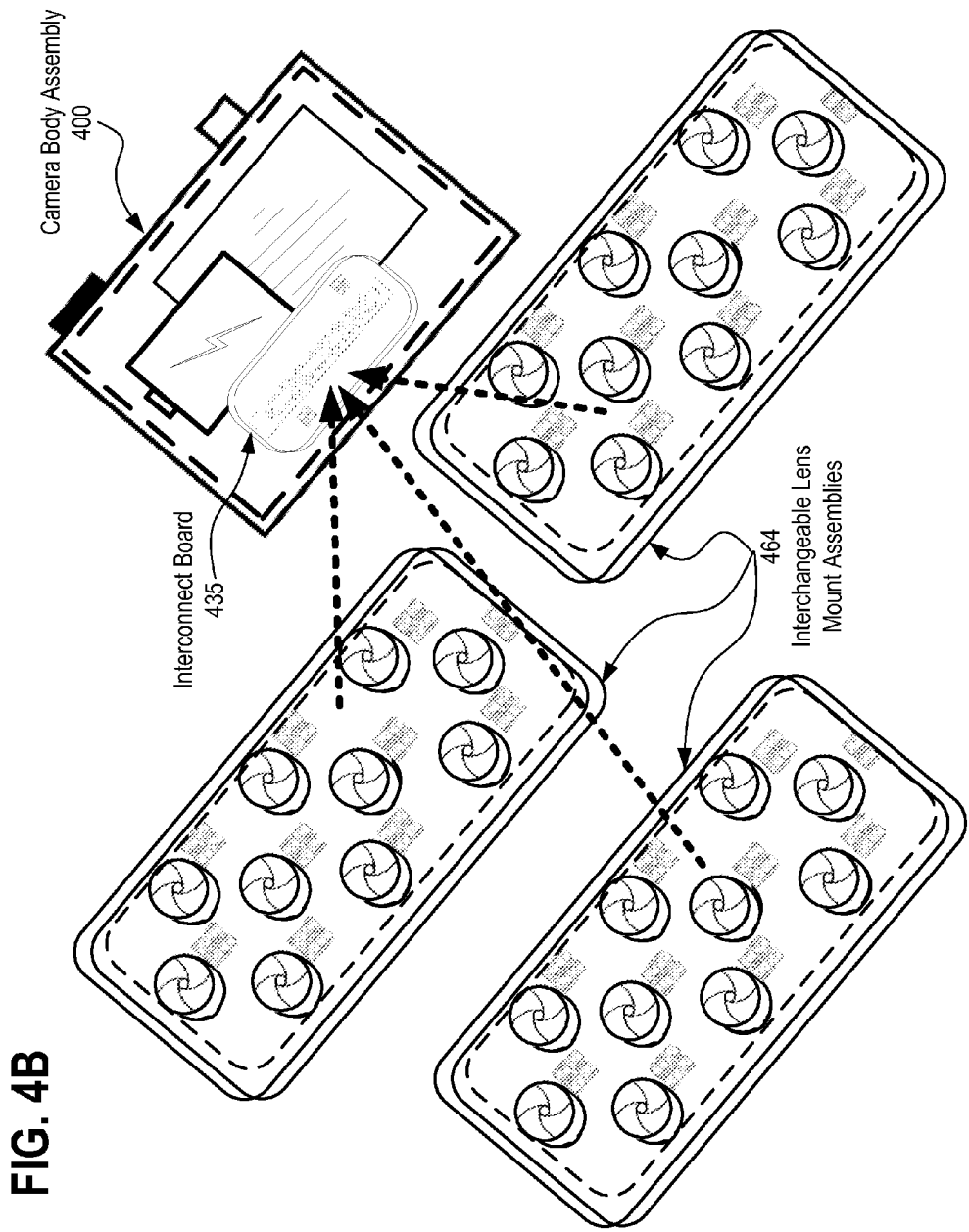
FIG. 4B illustrates interchangeable lens mount assemblies mountable to a camera body assembly in accordance with described embodiments.

FIG. 4B illustrates interchangeable lens mount assemblies 464 mountable to a camera body assembly 400 in accordance with described embodiments. For instance, a consumer may have multiple such interchangeable lens mount assemblies 464 which simply and easily are changed to and from a single camera body assembly 400 connecting via the interconnect board 435.

In such a way, a consumer may own a single multi-lens array camera operable with several lens mount assemblies, each having a different lens array configurations and the consumer simply interchanges the various lens mount assemblies onto the single multi-lens array camera.

Figure 4C:
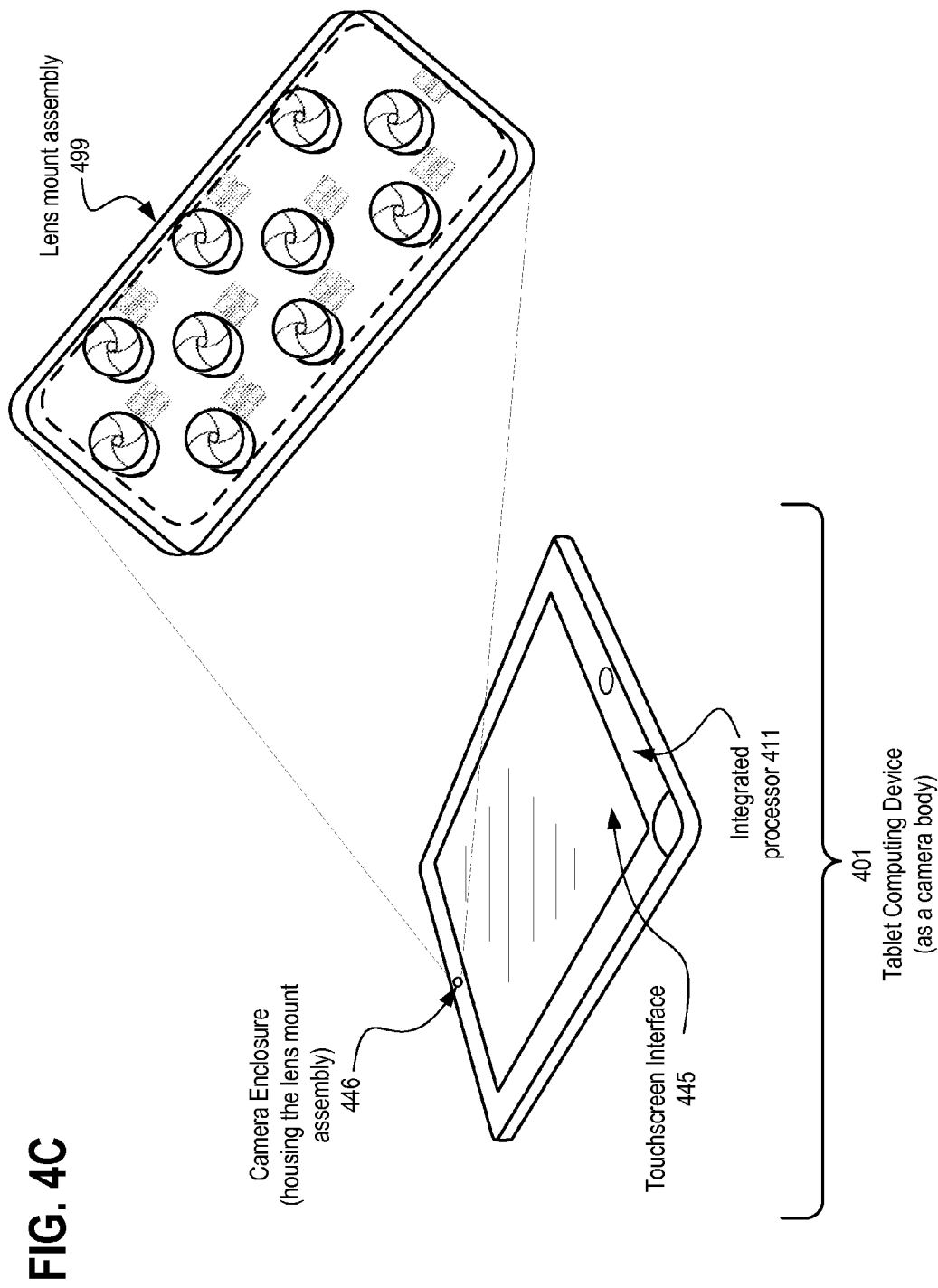
FIG. 4C illustrates an exemplary tablet computing device with a camera enclosure for a lens mount assembly in accordance with described embodiments.
Figure 4D:
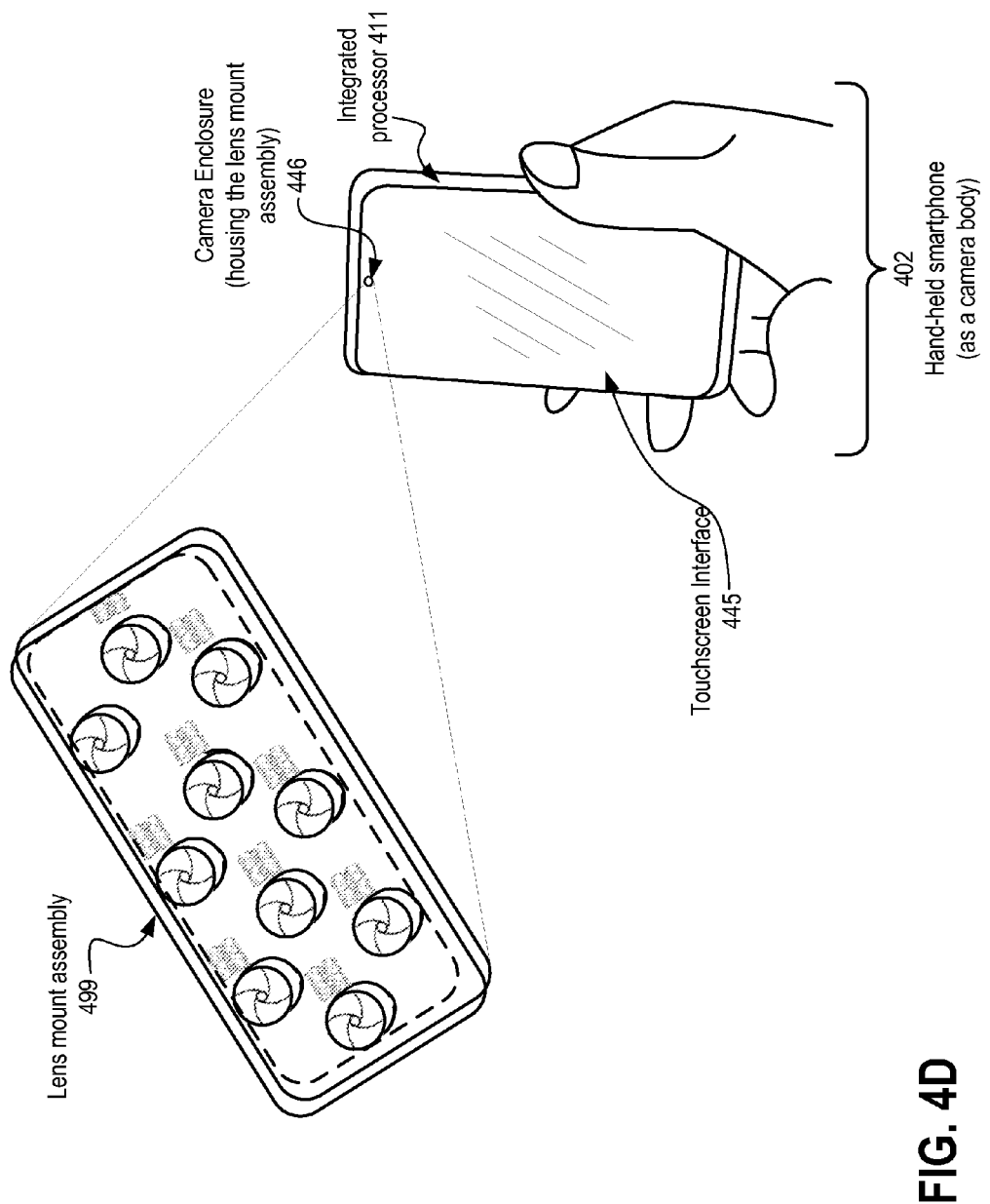
FIG. 4D illustrates an exemplary hand-held smartphone with a camera enclosure for a lens mount assembly in accordance with described embodiments.

FIG. 4C illustrates an exemplary tablet computing device 401 with a camera enclosure 446 (housing the lens mount assembly) for a lens mount assembly 499 in accordance with described embodiments. FIG. 4D illustrates an exemplary hand-held smartphone 402 with a camera enclosure 446 (housing the lens mount assembly) for a lens mount assembly 499 in accordance with described embodiments.

For instance, according to the described embodiments, the lens mount assembly 499 having the lenses and lens array thereupon as well as the image capture circuits as described previously is integrated within a consumer smartphone 402 or tablet computing device 401 as a camera body for the lens mount assembly 499 and neither the lenses of the lens array nor the mounting plate or image capture circuit are interchangeable by the consumer.

In another embodiment a consumer smartphone 402 or tablet computing device 401 exposes a standardized interconnect such as that shown at element 336 of FIG. 3 to mount via an interconnect board (336, 435) capable of receiving a lens mount assembly 499 having the lens array and the image capture circuits affixed thereto, such that the consumer smartphone 402 or tablet computing device 401 is operable with different lens arrays and lens mount assemblies.

In accordance with one embodiment, the consumer smartphone 402 or tablet computing device 401 having a touchscreen interfaced 445 integrated therein forms the camera body to which the lens mount assembly 499 is integrated or installed.

FIGS. 4C and 4D depict the tablet computing device 401 and the hand-held smartphone 402 each having a circuitry integrated therein as described in accordance with the embodiments. As depicted, each of the tablet computing device 401 and the hand-held smartphone 402 include a touchscreen interface 403 and an integrated processor 411 in accordance with disclosed embodiments.

For example, in one embodiment, a tablet computing device 401 or a hand-held smartphone 402, includes a display unit which includes a touchscreen interface 403 for the tablet or the smartphone and further in which memory and an integrated circuit operating as an integrated processor are incorporated into the tablet or smartphone, in which the integrated processor is operable in conjunction with the lens mount assemblies and lens arrays described herein; the tablet or smartphone and its processing components being further operable to perform image capture and manipulation, such as interpolation of light sample data from the multiple lenses of a lens array assembly. In one embodiment, the integrated circuit described above or the depicted integrated processor of the tablet or smartphone is an integrated silicon processor functioning as a central processing unit (CPU)

and/or a Graphics Processing Unit (GPU) for a tablet computing device or a smartphone.

Figure 4E:
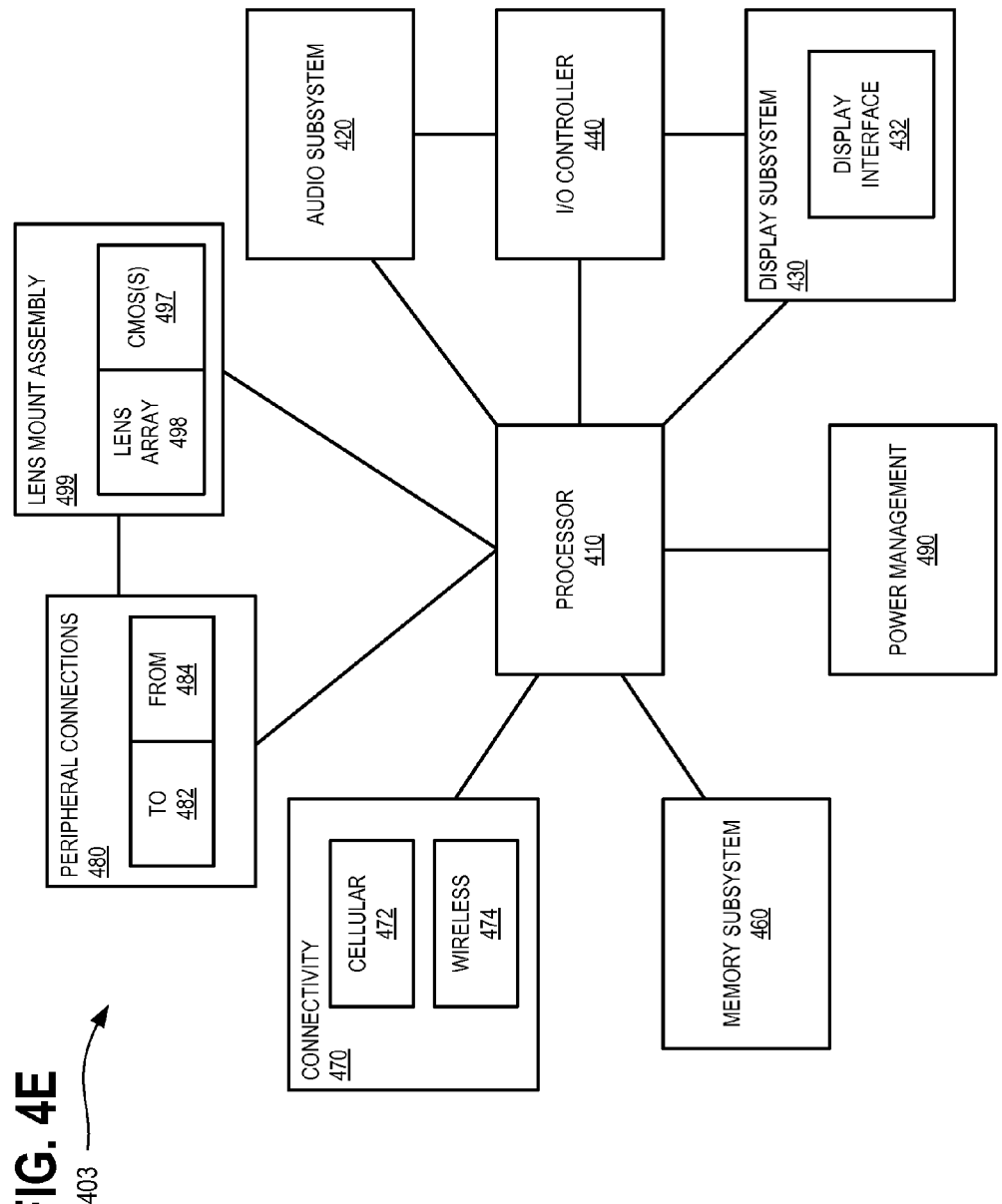
FIG. 4E is a block diagram of an embodiment of tablet computing device, a smart phone, or other mobile device having touchscreen interface connectors and a lens mount assembly with a lens array and CMOS(s) integrated therein in accordance with described embodiments.

FIG. 4E is a block diagram 400 of an embodiment of tablet computing device, a smart phone, or other mobile device in which touchscreen interface connectors are used. Processor 410 performs the primary processing operations. Audio subsystem 420 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 410.

Lens mount assembly 499 is depicted as communicably interfaced to the processor 410 and peripheral connections 480. Lens mount assembly 499 includes lens array 498 and CMOS(s) 497.

Display subsystem 430 represents hardware (e.g., display devices) and software (e.g., drivers) components that provide a visual and/or tactile display for a user to interact with the tablet computing device or smart phone. Display subsystem 430 includes display interface 432, which includes the particular screen or hardware device used to provide a display to a user. In one embodiment, display subsystem 430 includes a touchscreen device that provides both output and input to a user.

I/O controller 440 represents hardware devices and software components related to interaction with a user. I/O controller 440 can operate to manage hardware that is part of an audio subsystem 420 and/or display subsystem 430. Additionally, I/O controller 440 illustrates a connection point for additional devices that connect to the tablet computing device or smart phone through which a user might interact. In one embodiment, I/O controller 440 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 490 that manages battery power usage, charging of the battery, and features related to power saving operation. Memory subsystem 460 includes memory devices for storing information in the tablet computing device or smart phone. Connectivity 470 includes hardware devices (e.g., wireless and/or wired connectors and communication hardware) and software components (e.g., drivers, protocol stacks) to the tablet computing device or smart phone to communicate with external devices. Cellular connectivity 472 may include, for example, wireless carriers such as GSM (global system for mobile communications), CDMA (code division multiple access), TDM (time division multiplexing), or other cellular service standards). Wireless connectivity 474 may include, for example, activity that is not cellular, such as personal area networks (e.g., Bluetooth), local area networks (e.g., WiFi), and/or wide area networks (e.g., WiMax), or other wireless communication.

Peripheral connections 480 include hardware interfaces and connectors, as well as software components (e.g., drivers, protocol stacks) to make peripheral connections as a peripheral device ("to" 482) to other computing devices, as well as have peripheral devices ("from" 484) connected to the tablet computing device or smart phone, including, for example, a "docking" connector to connect with other computing devices. Peripheral connections 480 include common or standards-based connectors, such as a Universal Serial Bus (USB) connector, DisplayPort including MiniDisplayPort (MDP), High Definition Multimedia Interface (HDMI), Firewire, etc.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein including embodying the lens array assembly.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes software 522 and an image post processing 524 functionality which is interfaced with the interpolation circuit 523 capable of performing interpolation processing between among the data captured by the different lenses of the lens array. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein including operationally interfacing to the lens array assembly.

The computer system 500 may further include a network interface card 508. The computer system 500 also may include a user interface 510 (such as a video display unit, a liquid crystal display (LCD), touch screen, or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

FIG. 6 is a flow diagram illustrating a method 600 for using a multi-lens array camera and lens array assembly in accordance with the described embodiments. Some of the blocks and/or operations listed below are optional in accordance with certain embodiments. The numbering of the blocks presented is for the sake of clarity and is not intended to prescribe an order of operations in which the various blocks must occur.

At block 605, a first lens array assembly is coupled to a camera body.

At block 610, an image is captured via the first lens array assembly.

At block 615, the first lens array assembly is decoupled from the camera body.

At block 620, a second lens array assembly is coupled to the camera body.

And at block 625, an second image is captured via the second lens array assembly.

Optional processing may further take place via a processor and a memory of the camera body housing for the lens array assembly, including image display, image manipulation, interpolation of lens array data captured via the lens array assembly, and transmitting images from the camera body housing to a remote location via removable storage, wired, or wireless networking, etc.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A lens mount assembly, comprising:
   a lens mount having a front side and a back side;
   a lens array mounted to the front side of the lens mount, the lens array having a plurality of optics embedded within lenses mounted to the front side of the lens mount;
   a plurality of image capture circuits at the back side of the lens mount, the plurality of image capture circuits having a one to one correspondence to the lenses of the lens array mounted to the front side of the lens mount; and
   a plurality of receiving couplers at the front side of the lens mount, each to receive one of the lenses of the lens array, wherein the receiving couplers mechanically bring the optics of the respective lens mounted thereto into alignment with a corresponding one of the image capture circuits on the back side of the lens mount opposing the mounted lens, wherein the plurality of receiving couplers at the front side of the lens mount force alignment of each lens on a first plane;
   an alignment mark at each of the plurality of receiving couplers, each of the alignment marks being aligned with an axis or a center of a corresponding image capture circuit for a respective one of the plurality of receiving couplers; and
   wherein each lens of the lens array is manually aligned or align-able to a second plane by a consumer end-user via the alignment mark at each of the plurality of receiving couplers.

2. The lens mount assembly of claim 1:
   wherein the lens mount comprises an aluminum lens mounting plate mount, having the plurality of receiving couplers for the lenses machined into the aluminum mounting plate to form physical lens mounts via the machined receiving couplers for each of the plurality of lenses making up the lens array when mounted by the lenses.

3. The lens mount assembly of claim 1:
   wherein the front side of the lens mount comprises an analog front end in physical and mechanical alignment to the plurality of image capture circuits of a digital back end at the back side of the lens mount through the lens mount.

4. The lens mount assembly of claim 1:
   wherein the lens mount assembly is interchangeable by an end-user consumer on a multi-lens array camera, the lens mount assembly having an analog front end at the front side of the lens mount and a digital back end at the back side of the lens mount, in which the analog front end includes a front surface of the lens mount having a plurality of optics embedded within lenses mounted thereupon, and in which the lens mount includes the digital back end including a circuit board with the plurality of image capture circuits having a one to one correspondence to the multiple optics of the analog front end and in physical and mechanical alignment to the plurality of image capture circuits of the digital back end through the lens mount.

5. The lens mount assembly of claim 1:
   wherein the alignment mark at each of the plurality of receiving couplers comprises a 90-degree mark visible upon a front surface of the lens mount having the plurality of optics embedded therein, the 90-degree mark being aligned with the axis or the center of the corresponding image capture circuit;
   wherein manual alignment to the second plane by the consumer end-user via the alignment mark includes at least manual alignment to the second plane of a replacement lens for one of the plurality of lenses of the lens array by the consumer end-user via the 90-degree mark.

6. The lens mount assembly of claim 1:
wherein individual lenses of the lens array are replaceable by an end-user consumer, wherein the individual lens when replaced is re-aligned to the lens mount via mechanical lens mount guides which mechanically force the optics of the replaced lens into alignment with a corresponding image capture circuit fixedly attached to an opposing side of the lens mount, wherein the image capture circuit fixedly attached to an opposing side of the lens mount is not replaceable by the consumer; and
wherein the optics of the lens are embedded within the replaced lens and aligned to mechanical lens mount guides of the lens complementary to the receiving couplers of the lens mount, the mechanical lens mount guides of the lens mechanically coupling the lens to the receiving couplers on the lens mount and to mechanically align the lens to the lens mount, brining the optics embedded within the lens into alignment with the corresponding image capture circuit fixedly attached to the opposing side of the lens mount.

7. The lens mount assembly of claim 1:
wherein each lens of the lens array has a single focal point at a single angle in a single image capture mode at a single moment in time; and
wherein the lens array has a multiple different focal lengths and focal points at multiple angles in multiple image capture modes at a single moment in time.

8. The lens mount assembly of claim 1:
wherein the multiple different focal lengths include two or more simultaneous focal length types selected from the group comprising: telephoto, wide-angle, macro, and fisheye; and
wherein the multiple image capture modes at the single moment in time include two or more different characteristics simultaneously, the two or more different characteristics selected from the group comprising: two or more aperture settings, two or more different filters, and two or more different shutter speeds.

9. The lens mount assembly of claim 1:
wherein the lens mount assembly is coupled with a camera body assembly having at least a processor and a memory embedded therein to perform logic;
wherein the lens array captures light information from multiple physically different positions;
wherein the logic determines the distance to an object in a captured image based on the light information from the multiple physically different positions.

10. The lens mount assembly of claim 9:
wherein the logic performs edits to the captured image that only affect objects that are at a specified distance or a specified distance range, leaving objects nearer or father than the specified distance or the specified distance range unaffected by the edits.

11. The lens mount assembly of claim 9:
wherein the logic changes a vantage point of the captured image based on the determined distance and based on the light information from the multiple physically different positions.

12. The lens mount assembly of claim 1:
wherein all of the lenses of the lens array are of the same lens type to form a heterogeneous lens array or alternatively wherein two or more of the lenses of the lens array are of different types to form a heterogeneous lens array, the two different lens types each having optics embedded therein of differing characteristics, including at least one or more of different focal lengths, different apertures, different shutter speeds, and/or different filters.

13. The lens mount assembly of claim 1:
wherein the receiving couplers compatibly mount a 35-mm lens for a conventional digital or film Single Lens Reflex camera.

14. The lens mount assembly of claim 1, wherein each lens is mounted to the receiving couplers of the lens mount via one of:
threaded screw mounts;
an S-Mount type lens mount;
an E-Mount type lens mount;
a T-Mount type lens mount;
an EF type lens mount;
an ES type lens mount;
an EF-S type lens mount;
an F type lens mount;
an M42 type lens mount;
a K type lens mount;
a micro-four-thirds (4/3) type lens mount;
an FD type lens mount;
an NEX type lens mount;
an R type lens mount;
an ND type lens mount; and
an MD/MC/SR compatible type lens mount.

15. The lens mount assembly of claim 1:
wherein the optics at the front side of the lens mount capture or sample light forming an analog optical front end of the lens mount assembly and the optics transmit the captured or sampled light to the image capture circuits on the back side of the lens mount forming a digital back end of the lens mount assembly; and
wherein the digital back end is communicably interfaced to other array camera components and circuitry via one or more high-speed serial interfaces.

16. The lens mount assembly of claim 1:
wherein the image capture circuits are Complementary Metal-Oxide-Semiconductor (CMOS) circuits fixedly attached to circuit board, the circuit board being installed into the lens mount assembly.

17. The lens mount assembly of claim 1:
wherein all of the individual lenses of the lens array are aligned to point in parallel to the other lenses of the lens array.

18. The lens mount assembly of claim 1:
wherein the lens array has a convex orientation upon the lens mount and the mechanical coupling of the lenses to the lens mount via the receiving couplers keeps the orientation of the lenses to one another with each lens being oriented to be pointed out at a slight angle from the other lenses in the lens array while remaining in a rigid attachment to the lens mount and in a fixed orientation to the other lenses once mounted to the lens mount.

19. The lens mount assembly of claim 1:
wherein the lenses of the lens array are physically aligned to the lens mount in a non-parallel orientation, the lenses aligned in a pre-determined fixed degree of angular departure between the respective lenses of the lens array, enforced by the physical receiving couplers of the lens mount; and
wherein post-image-capture processing via a processor and a memory of a camera body assembly coupled with the lens mount assembly adapts the sampled light captured by multiple optics of the lens array according to the pre-determined fixed degree of angular departure between the respective lenses.

20. The lens mount assembly of claim 1:
wherein the receiving couplers of the lens mount enforce a known distance between the optics embodied within each respective lens of the lens array and a corresponding image capture circuit and enforce a known axis between the optics embodied within each respective lens and the same corresponding image capture circuit.

21. The lens mount assembly of claim 1:
wherein of the receiving couplers of the lens mount include electronic contacts to interface in-camera controllable lens options including one or more of aperture, focus, and shutter speed with a compatible interchangeable lens; and
wherein each of the lenses of the lens array are to auto-focus at the instruction of a coupled camera body assembly, the instruction being transmitted to the lenses through the electronic contacts of the receiving couplers.

22. A lens mount assembly, comprising:
a lens mount having a front side and a back side;
a lens array mounted to the front side of the lens mount, the lens array having a plurality of optics embedded within lenses mounted to the front side of the lens mount;
a plurality of image capture circuits at the back side of the lens mount, the plurality of image capture circuits having a one to one correspondence to the lenses of the lens array mounted to the front side of the lens mount;
a plurality of receiving couplers at the front side of the lens mount, each to receive one of the lenses of the lens array, wherein the receiving couplers mechanically bring the optics of the respective lens mounted thereto into alignment with a corresponding one of the image capture circuits on the back side of the lens mount opposing the mounted lens;
a 90-degree mark aligned with an axis or a center of a corresponding image capture circuit;
wherein the receiving couplers of the lens mount force alignment of each lens on a first plane;
wherein each lens is manually aligned or align-able to a second plane via the 90-degree mark by a consumer end-user;
wherein the lens mount assembly is coupled with a camera body assembly having at least a processor and a memory embedded therein to perform logic;
wherein the logic is to perform post-image capture processing via a plurality of image interpolations to increase tolerance of misalignment between the individual lenses of the lens array and corresponding image capture circuits through the lens mount; and
wherein the interpolations include interpolating between light samples taken from a wide-angle lens of the lens array to a narrow angle lens of the lens array across an angular separation or across a spatial separation.

23. A camera body assembly, comprising:
a camera body;
a battery;
a display;
a processor and a memory to perform logic or instructions;
an interconnect board having integrated thereupon an interconnect adapted to receive a lens mount assembly; and
a lens mount assembly, the lens mount assembly, including:
a lens mount having a front side and a back side;
a lens array mounted to the front side of the lens mount, the lens array having a plurality of optics embedded within lenses mounted to the front side of the lens mount;
a plurality of image capture circuits at the back side of the lens mount, the plurality of image capture circuits having a one to one correspondence to the lenses of the lens array mounted to the front side of the lens mount; and
a plurality of receiving couplers at the front side of the lens mount, each to receive one of the lenses of the lens array, wherein the receiving couplers mechanically bring the optics of the respective lens mounted thereto into alignment with a corresponding one of the image capture circuits on the back side of the lens mount opposing the mounted lens, wherein the plurality of receiving couplers at the front side of the lens mount force alignment of each lens on a first plane;
an alignment mark at each of the plurality of receiving couplers, each of the alignment marks being aligned with an axis or a center of a corresponding image capture circuit for a respective one of the plurality of receiving couplers; and
wherein each lens of the lens array is manually aligned or align-able to a second plane by a consumer end-user via the alignment mark at each of the plurality of receiving couplers.

24. The camera body assembly of claim 23:
wherein the camera body comprises one of: a hand-held stand-alone camera, a tablet computing device, and a hand-held smartphone; and
wherein the lens mount assembly is integrated into the camera body by an Original Equipment Manufacturer (OEM) for the hand-held stand-alone camera, the tablet computing device, or the hand-held smartphone.

25. A method comprising:
mounting a lens mount assembly to a camera body assembly of a multi-lens array camera, wherein the lens mount assembly comprises:
a lens mount having a front side and a back side;
a lens array mounted to the front side of the lens mount, the lens array having a plurality of optics embedded within lenses mounted to the front side of the lens mount;
a plurality of image capture circuits at the back side of the lens mount, the plurality of image capture circuits having a one to one correspondence to the lenses of the lens array mounted to the front side of the lens mount; and
receiving, at each one of a plurality of receiving couplers at the front side of the lens mount, one of the lenses of the lens array, wherein the plurality of receiving couplers mechanically bring the optics of the respective lens mounted thereto into alignment with a corresponding one of the image capture circuits on the back side of the lens mount opposing the mounted lens, wherein the plurality of receiving couplers at the front side of the lens mount force alignment of each lens on a first plane;
the lens mount assembly having an alignment mark at each of the plurality of receiving couplers, each of the alignment marks being aligned with an axis or a center of a corresponding image capture circuit for a respective one of the plurality of receiving couplers;

capturing a first image with the lens mount assembly;
decoupling the lens mount assembly from the camera body assembly;
coupling a second lens mount assembly to the camera body assembly, the second lens mount having a second lens array with different optical characteristics than the lens array of the first lens mount assembly;
manually aligning each lens of the lens array to a second plane via the alignment mark at each of the plurality of receiving couplers; and
capturing a second image with the second lens mount assembly.

\* \* \* \* \*